United States Patent
Goldstein et al.

(10) Patent No.: US 7,680,973 B2
(45) Date of Patent: Mar. 16, 2010

(54) SIDEBAND SIGNAL FOR USB WITH INTERRUPT CAPABILITY

(75) Inventors: Floyd Goldstein, Grass Valley, CA (US); John Goodman, Reno, NV (US); Dung Hua, Sparks, NV (US)

(73) Assignee: IGT, Reno, NV (US)

( * ) Notice: Subject to any disclaimer, the term of this patent is extended or adjusted under 35 U.S.C. 154(b) by 205 days.

(21) Appl. No.: 11/760,473

(22) Filed: Jun. 8, 2007

(65) Prior Publication Data
US 2008/0307140 A1 Dec. 11, 2008

(51) Int. Cl.
G06F 13/24 (2006.01)
H02J 7/04 (2006.01)
G06F 13/42 (2006.01)

(52) U.S. Cl. .................. 710/260; 710/62; 710/105; 320/145; 702/60; 713/340; 700/286; 463/20; 463/40

(58) Field of Classification Search .................. None
See application file for complete search history.

(56) References Cited

U.S. PATENT DOCUMENTS

| | | | |
|---|---|---|---|
| 5,554,968 A | 9/1996 | Lee | |
| 5,958,020 A | 9/1999 | Evoy et al. | |
| 6,012,115 A * | 1/2000 | Chambers et al. | 710/105 |
| 6,064,554 A | 5/2000 | Kim | |
| 6,085,265 A | 7/2000 | Kou | |
| 6,633,932 B1 | 10/2003 | Bork et al. | |
| 6,668,296 B1 | 12/2003 | Dougherty et al. | |
| 6,685,567 B2 | 2/2004 | Cockerille et al. | |
| 6,741,066 B1 * | 5/2004 | Densham et al. | 320/145 |
| 6,899,627 B2 * | 5/2005 | Lam et al. | 463/40 |
| 6,990,542 B2 * | 1/2006 | Nguyen | 710/260 |
| 7,073,006 B2 | 7/2006 | Nguyen | |
| 7,327,221 B1 * | 2/2008 | Callaghan | 340/310.11 |
| 7,483,797 B2 * | 1/2009 | Nambu | 702/60 |
| 2004/0186926 A1 * | 9/2004 | Rapaich | 710/8 |
| 2005/0194909 A1 * | 9/2005 | Ooishi | 315/56 |
| 2008/0005415 A1 * | 1/2008 | Lopez et al. | 710/62 |

FOREIGN PATENT DOCUMENTS

EP 1351409 A1 10/2003

(Continued)

OTHER PUBLICATIONS

MICRO/SYS—"White Paper: Interrupts and USB"; 1 page, No Date Provided.*

(Continued)

*Primary Examiner*—Mark Rinehart
*Assistant Examiner*—Brian T Misiura
(74) *Attorney, Agent, or Firm*—Weaver Austin Villeneuve & Sampson LLP

(57) ABSTRACT

The invention provides for a sideband signal for the USB that has real-time interrupt capabilities. A system and method for hardware detection of an interrupt signal provides for the ability to superimpose a high frequency interrupt signal on a USB power line for transmission to a controller. Alternatively, an overcurrent flow may be generated from a peripheral device and detected by an overflow current detector on the USB. In response, the overflow current detector may output an interrupt/overflow current detection signal to the controller.

18 Claims, 5 Drawing Sheets

FOREIGN PATENT DOCUMENTS

EP             1816571 A1     8/2007
WO    WO 2008/154144 A1    12/2008

OTHER PUBLICATIONS

Korean to English machine translation of Korean Patent Application Publication No. KR2003-0044112, Inventor: Gyeong-Uk Kim, Published on Jun. 9, 2003; 8 pages.*

Korean to English machine translation of Korean Patent Application Publication No. 10-2001-0038280, Inventor: Jae-Uk Choi, Published on May 15, 2001; 7 pages.*

PCT Int'l Search Report and Written Opinion dated Sep. 5, 2008 from PCT/US2008/064540.

* cited by examiner

SIDEBAND SIGNAL FOR USB WITH INTERRUPT CAPABILITY

FIELD OF THE INVENTION

The present invention relates to a universal serial bus (USB). More particularly, the present invention relates to hardware real-time detection of interrupt signals in a USB.

BACKGROUND OF THE INVENTION

The USB is an industry standardized bus architecture developed to provide efficient, cost effective connections of peripherals to gaming machine systems, consumer electronics, personal computers, and other electronic devices. USB is designed to efficiently integrate many various peripheral devices (e.g., up to 127 peripheral devices per USB port) to the gaming machine system. There are a wide variety of associated peripheral devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game. All of these functions may be performed via a USB.

USB differs from previous expansion bus systems. One difference is that USB connects peripheral devices to the gaming machine system without consuming the input output resources of the gaming machine system. Unlike previous expansion bus systems, peripheral devices designed to function with USB do not require memory or input output address space and do not require interrupt request lines from the gaming machine system. This increases the number of peripheral devices the gaming machine may reliably support. USB also provides a single connector type to connect peripheral devices designed to function with USB. Each peripheral device connects to a standard USB connector. Additionally, USB provides the ability to couple a number of peripheral devices to a single USB connector. USB also provides for automatic Peripheral device configuration and eliminates gaming machine system resource conflicts. These, and other, advantages allow USB to simplify and ease the process of adding peripheral devices to a gaming machine, providing a "plug and play" system.

Currently, a USB controller determines peripheral device states by periodically polling (i.e., querying) each peripheral device. Each connected peripheral device is polled in successive 1 ms intervals (e.g., frames). When a connected peripheral device requires service (e.g., a data transfer from an internal buffer to the master gaming controller), it waits until the next 1 ms interval, or frame, in which it is polled to communicate the required service to the USB controller or master gaming controller. In this manner, each connected peripheral device is polled in a round-robin manner to determine whether it requires service. It would be desirable to provide improvements over prior art methods.

BRIEF DESCRIPTION OF THE INVENTION

The invention provides for a sideband signal for the USB that has real-time interrupt capabilities. A system and method for hardware detection of an interrupt signal provides for the ability to superimpose a high frequency interrupt signal on a USB power line for transmission to a controller. Alternatively, an overcurrent flow may be generated from a peripheral device and detected by an overflow current detector on the USB. In response, the overflow current detector may output an interrupt/overflow current detection signal to the controller.

In one embodiment, a system to detect an interrupt signal on a USB may have at least one peripheral device, a controller coupled to the at least one peripheral device via a USB, the USB having at least one power line, wherein high frequency interrupt communication signals from the at least one peripheral device are superimposed on the at least one power line and transmitted to the controller in real-time, and wherein the at least one power line is a bi-directional communication line to transmit high frequency communication signals from the controller to the at least one peripheral device.

In another embodiment, a gaming machine may have a master gaming controller to generate a game of chance, at least one peripheral device coupled to the master gaming machine via a USB, the USB having at least one power line, wherein high frequency interrupt communication signals from the at least one peripheral device are superimposed on the at least one power line and transmitted to the master gaming controller in real-time, and wherein the at least one power line is a bi-directional communication line to transmit high frequency communication signals from the master gaming controller to the at least one peripheral device.

A method to detect an interrupt in a gaming machine may comprise coupling a master gaming controller to at least one peripheral device via a universal serial bus (USB), the USB having a power line, detecting an interrupt event by the at least one peripheral device, generating a high frequency interrupt signal by the at least one peripheral device in response to the interrupt event, superimposing the high frequency interrupt signal over the power line, and transmitting the high frequency interrupt signal to the master gaming controller over the power line in real-time.

The present invention provides other hardware configured to perform the methods of the invention, as well as software stored in a machine-readable medium (e.g., a tangible storage medium) to control devices to perform these methods.

These and other features of the present invention will be presented in more detail in the following detailed description of the invention and the associated figures.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention.

In the drawings.

DETAILED DESCRIPTION

Figure 1:
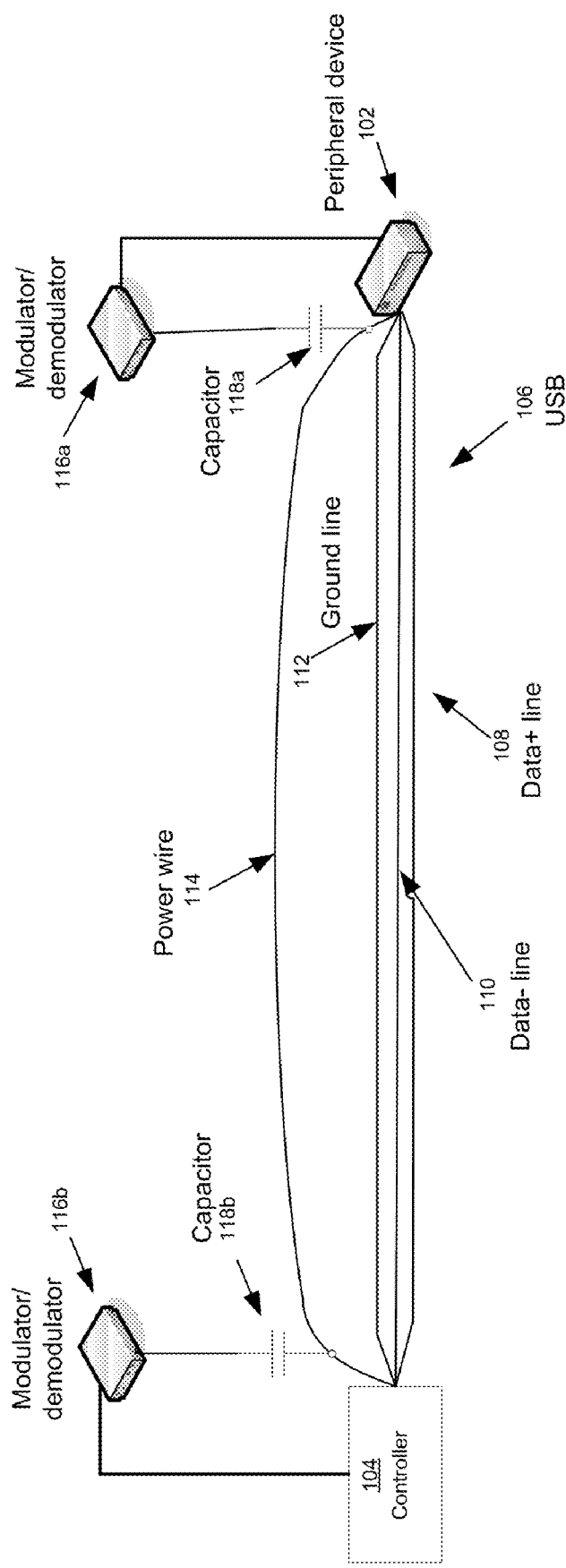
FIG. 1 illustrates an exemplary diagram of a USB system having a sideband signal with real-time interrupt capabilities.

Embodiments are described herein in the context of a sideband signal for USB with interrupt capability. Those of ordinary skill in the art will realize that the following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Additionally, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The invention provides for a hardware capability to transmit real-time interrupt signals in a USB as a sideband signal. Currently, the USB standard does not permit a peripheral device to send a real-time interrupt to the controller to inform the controller of an interrupt event. Although existing USB standards provide for a protocol interrupt transfer type, it is generated through the differential data lines and is not a real-time interrupt.

The sideband signal may be a signal transmitted along the existing USB power line or as an overcurrent detection signal to the controller. Furthermore, the USB power line may be used for bi-directional communication between the controller and the peripheral device. When used in a gaming environment, as discussed below, the interrupt capability may allow for greater efficiency, increase playtime for players, and decrease in down time for a gaming machine since the interrupt event may be detected in real-time.

An interrupt event may be a time sensitive or high priority communication. For example, a USB ticket printer may be powered up for the first time and runs a SHA2 algorithm on the flash image of the device. If it is determined that the SHA2 value does not match the stored SHA2 value, the ticket printer could continuously print out ticket values worth an unknown amount of money thereby costing the casino unknown amounts of money. Thus, an interrupt must be generated immediately to inform the host that the board's code image is corrupted and must alert the attendants immediately.

In another example, a secure and sensitive USB device is protected by a telltale system inside the slot machine. A hacker may manage to open the enclosure and get access to the electronics of the machine. Thus, an interrupt event must be generated immediately to inform the host that the device has been tampered with.

In yet another example, a gaming peripheral may have a fault condition that prevents the peripheral from communicating with the host gaming platform through normal USB communication. The gaming platform may then issue and interrupt or a reset pulse to the peripheral by way of the side band signal.

FIG. 1 illustrates an exemplary diagram of a USB system having a sideband signal with real-time interrupt capabilities. The system has at least one peripheral device 102 coupled to a controller 104 via a USB 106. The peripheral device 102 may be any known device such as lights, ticket printers, card readers, speakers, bill validators, ticket readers, coin acceptors, display panels, key pads, coin hoppers, button pads, or player tracking devices. The controller 104 may be a processor in any device such as a server or gaming machine as further discussed below. The peripheral devices 102 and controller 104 may have a general input/output port to connect with the USB 106. The USB 106 may have four lines: a power wire 114, a ground line 112, a data positive line 108, and a data negative line 110 as is known in the art.

When an interrupt event is detected by the peripheral device 102, the peripheral device 102 may generate a high frequency interrupt or sideband signal. The high frequency interrupt signal may be modulated or converted from a digital signal to an analog signal with a modulator/demodulator modem 116a for transmission over the USB power line 114. The modulated high frequency interrupt signal may then be superimposed on the USB power line 114 and transmitted to the controller 104 in real-time. A capacitor 118a, 118b may be used to block or filter low frequency signals. Additionally, current sensing methods may be used to sense hi-speed current signals. Common current sensors methods are current transformers, Hall Effect sensors and current sense resistors.

This ensures that only high frequency signals are transmitted to the controller 104 and/or peripheral device 102. The high frequency signals may be transmitted at a frequency greater than or equal to 60 Hz in an AC circuit or greater than or equal to 0 Hz in a DC circuit.

The high frequency interrupt signal may then be demodulated or converted back to a digital signal by the modulator/demodulator modem 116b to be received by the controller 104. Thus, the controller 104 is made aware of the interrupt event at the peripheral device 102 in real time.

The modulator/demodulator may be any type of modem such as such as an AC mains communications modulator/demodulator, and the like. The modulator/demodulator may be part of the controller and/or peripheral device or may be a separate device coupled to and remote from the controller and/or peripheral device.

The master gaming controller 104 may also communicate with the peripheral device by transmitting a high frequency signal through the USB power line 114. The communication signal may be modulated with the modulator/demodulator 116b, superimposed on the USB power line 114, demodulated with the modulator/demodulator 116a, and received by the peripheral device 102. As such, the USB power line 114 may be used as a bi-directional communication line to transmit communication signals from the peripheral device 102 to the master gaming controller 104 and vice versa. The communication may be in response to the interrupt signal or simply an inquiry from the controller 104.

Figure 2:
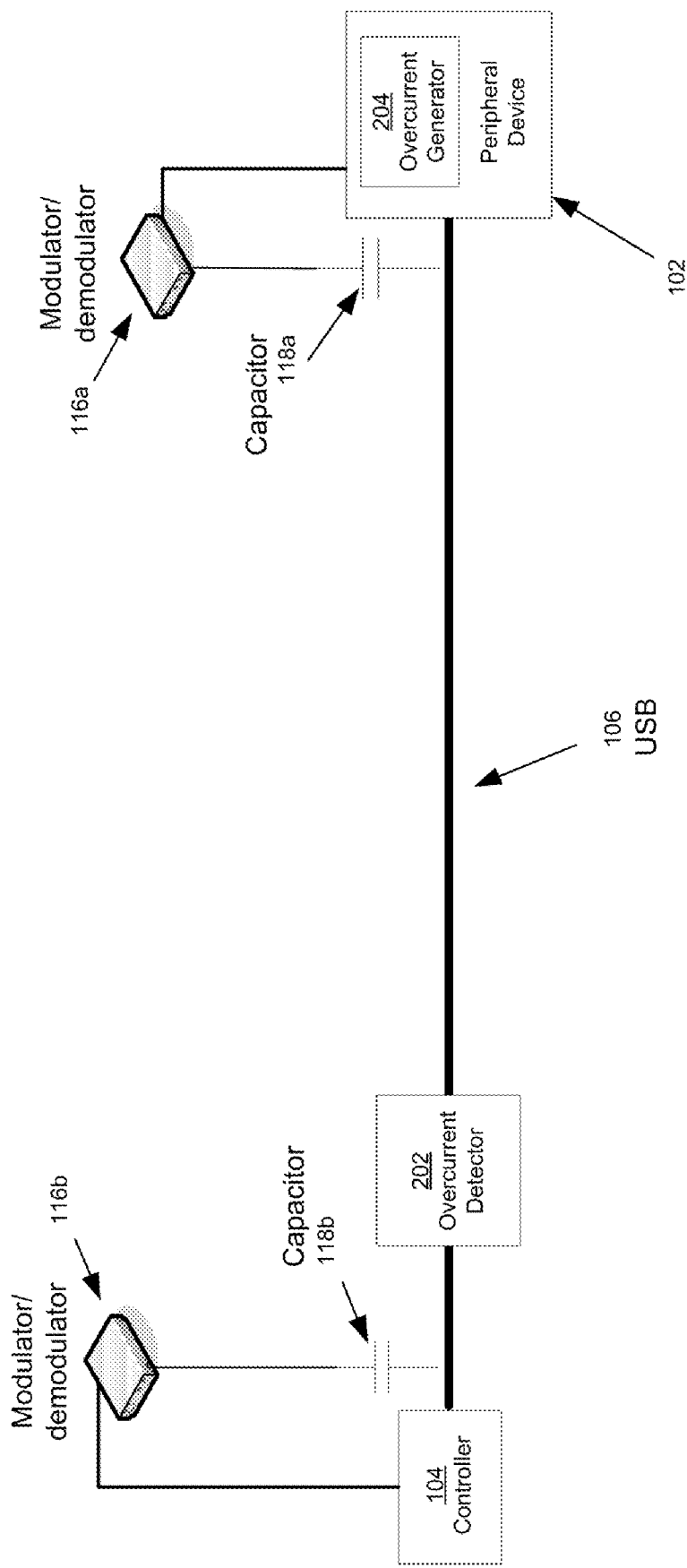
FIG. 2 illustrates another exemplary diagram of a USB system having a sideband signal with real-time interrupt capabilities.

FIG. 2 illustrates another exemplary diagram of a USB system having a sideband signal with real-time interrupt capabilities. The peripheral device 102 may have an overcurrent generator 204. When an interrupt event occurs, the overcurrent generator 204 may transmit additional current to the USB. The overcurrent flow will be detected by the overcurrent detector 202 on the USB 106. As a result, the overcurrent detector may output an interrupt/overcurrent detection signal that is transmitted to the controller 104 in real-time. In response to the overcurrent detection signal from the overcurrent detector 202, the controller 104 will determine which peripheral device 102 the overcurrent resulted from. In this manner, the controller 104 will be notified in real-time that an interrupt event occurred on the peripheral device 102.

Figure 3:
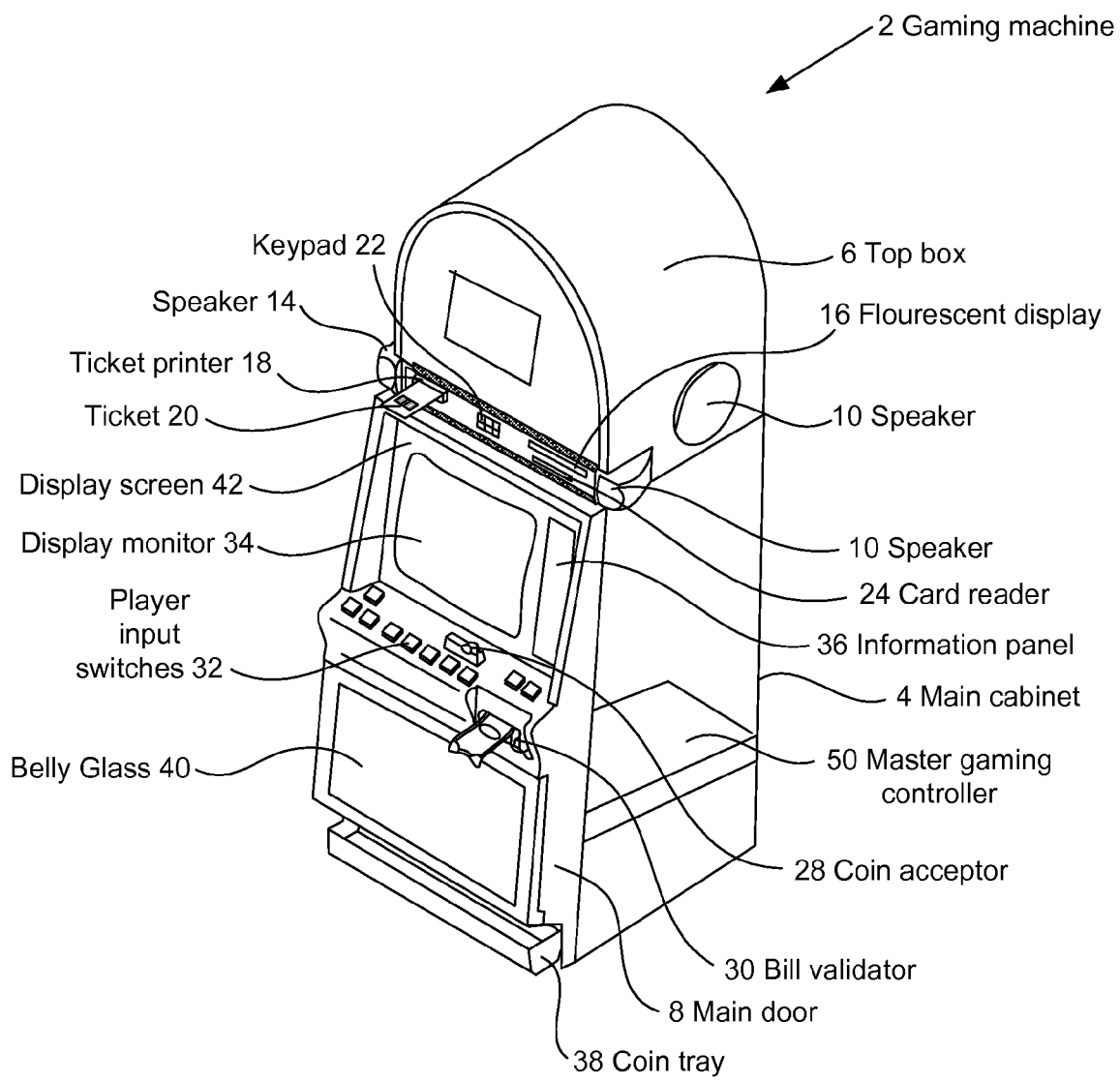
FIG. 3 illustrates an exemplary gaming machine.

In one exemplary embodiment, the invention may be used in a gaming environment. FIG. 3 illustrates an exemplary gaming machine. Machine 2 includes a main cabinet 4, which generally surrounds the machine interior and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices may be controlled by circuitry (e.g. the master gaming controller 50) housed inside the main cabinet 4 of the machine 2 via a USB.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may execute game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in FIG. 3. For example, the top box may contain a bonus wheel or a back-lit silk screened panel that may be used to add bonus features to the game being played on the gaming machine. As another example, the top box may contain a display for a progressive jackpot offered on the gaming machine. During a game, these devices may be controlled and powered, in part, by circuitry (e.g. a master gaming controller 50) housed within the main cabinet 4 of the machine 2 via a USB.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Figure 4A:
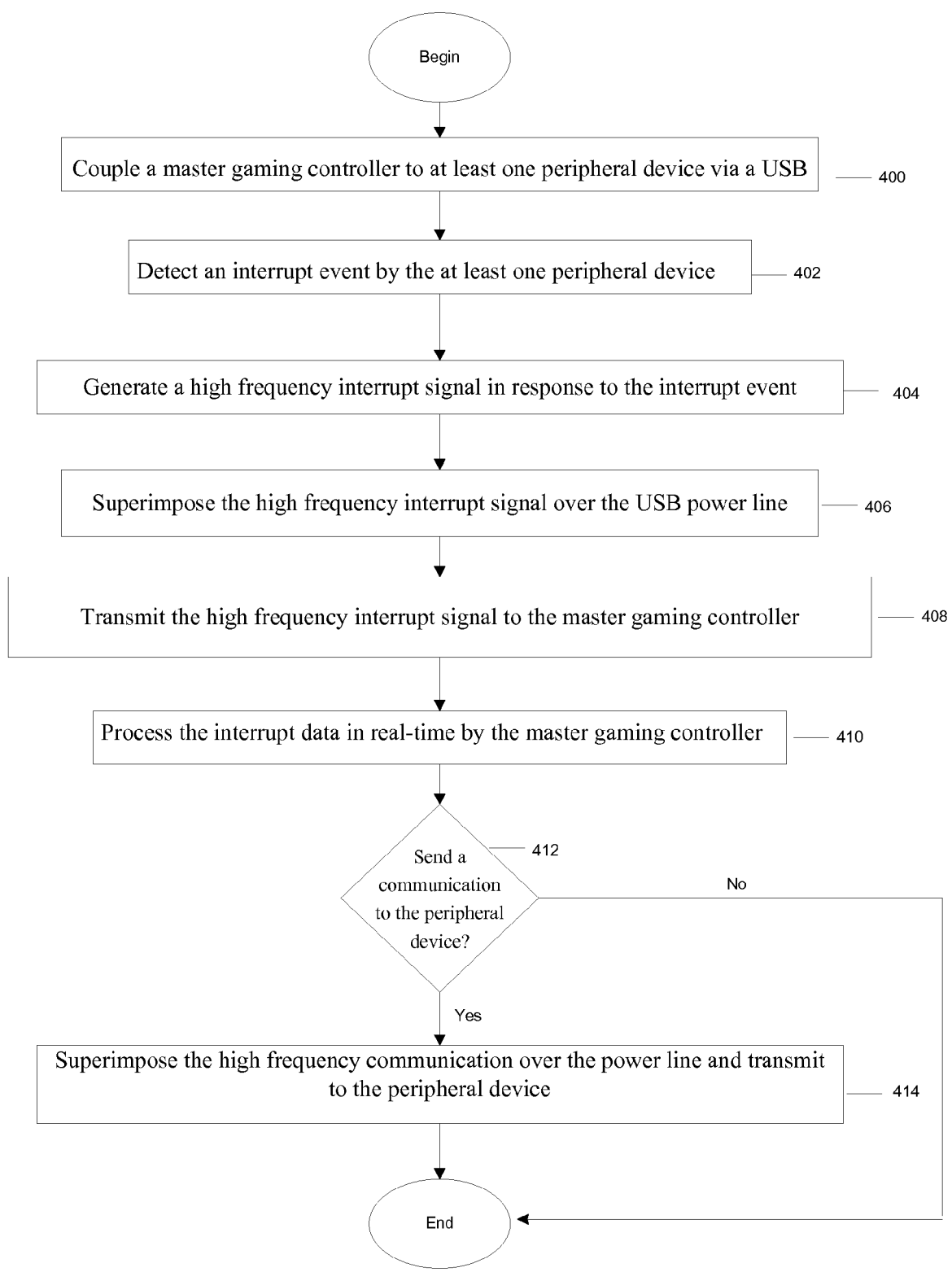
FIGS. 4A and 4B are flow diagrams of a method for detecting an interrupt signal in a gaming machine.
Figure 4B:
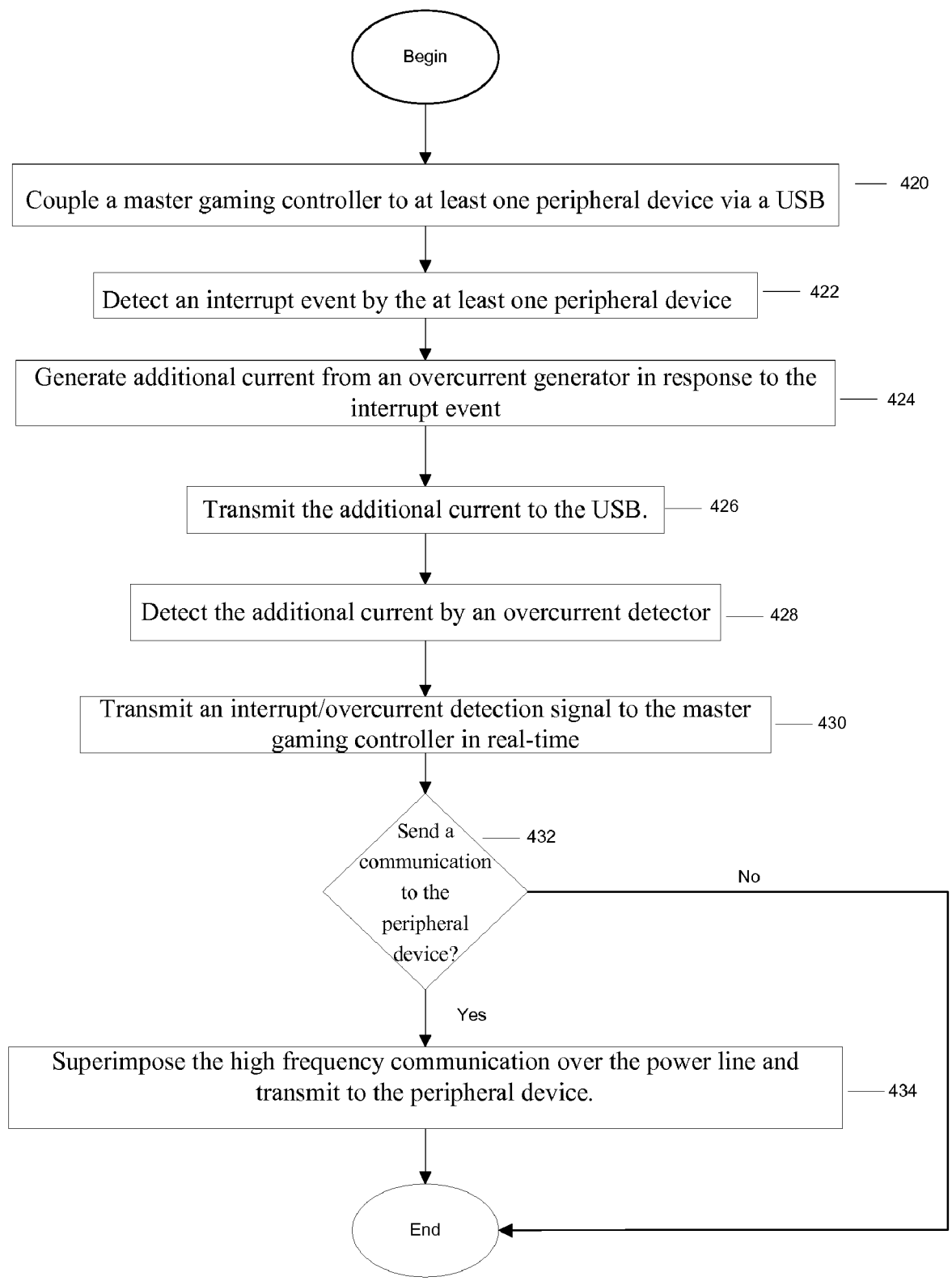

The invention also provides for a method to detect an interrupt signal in a USB. FIGS. 4A and 4B are flow diagrams of a method for detecting an interrupt signal in a gaming machine. The master gaming controller may be coupled to at least one peripheral device via a USB at 400. The peripheral device may be any known device such as lights, ticket printers, card readers, speakers, bill validators, ticket readers, coin acceptors, display panels, key pads, coin hoppers, button pads, and player tracking devices. The peripheral devices and master gaming controller may have a general input/output port to connect with the USB. The USB may have four lines: a power wire, a ground line, a data positive line, and a data negative line as in known in the art. However, additional lines may be used as necessary.

An interrupt event may be detected by the at least one peripheral device at 402. In response to the interrupt event, a high frequency interrupt signal may be generated by the peripheral device at 404. The high frequency interrupt signal may be modulated or converted from a digital signal to an analog signal with a modulator/demodulator modem for transmission over the USB power line.

The high frequency interrupt signal may be superimposed over the USB power line at 406 and transmitted to the master gaming controller at 408 over the power line. A capacitor may be used to block or filter low frequency signals. This ensures that only high frequency signals are transmitted to the master gaming controller. The high frequency signals may be transmitted at a frequency greater than or equal to 60 Hz in an AC circuit or greater than or equal to 0 Hz in a DC circuit.

The high frequency interrupt signal may then be demodulated or converted back to a digital signal by a second modulator/demodulator modem to be received by the master gaming controller and processed at 410. Thus, the master gaming controller is made aware of the interrupt event at the peripheral device in real time.

The master gaming controller 104 may also communicate with the peripheral device. If the master gaming controller would like to send a communication signal to the peripheral device at 412, either in response to the interrupt signal or simply an inquiry not in response to the interrupt signal, the high frequency communication signal may be superimposed over the USB power line and transmitted to the peripheral device at 414. As such, the USB power line may be used as a bi-directional communication line to transmit communication signals from the peripheral device to the master gaming controller and vice versa.

Referring now to FIG. 4B, a flow diagram of another exemplary method for detecting an interrupt in a gaming machine. The master gaming controller may be coupled to at least one peripheral device via a USB at 420. An interrupt event may be detected by the at least one peripheral device at 422. In response to the interrupt event, additional current may be generated from an overcurrent generator in the at least one peripheral device at 424. The additional current may be transmitted to the USB at 426 and detected by an overcurrent detector on the USB at 428. As a result, the overcurrent detector may output an interrupt/overcurrent detection signal that is transmitted to the master gaming controller in real-time at 430. In response to the overcurrent detection signal, the master gaming controller may determine which peripheral device the overcurrent resulted from. In this manner, the master gaming controller may be notified that an interrupt event occurred.

The master gaming controller may also communicate with the peripheral device. If the master gaming controller would like to send a communication signal to the peripheral device at 432, either in response to the interrupt signal or simply an inquiry not in response to the interrupt signal, the high frequency communication signal may be superimposed over the USB power line and transmitted to the peripheral device at 434.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

Gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in a gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 3, when a user wishes to play the gaming machine 2, he or she inserts cash through the coin acceptor 28 or bill validator 30. Additionally, the bill validator may accept a printed ticket voucher that may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. All these features may be possible via the use of a USB. Thus hardware interrupt capabilities will allow the master gaming controller to be notified of an interrupt event in real-time. This allows for great efficiency, increase in play time for players, and a decrease in down time for the gaming machines.

While embodiments and applications of this invention have been shown and described, it would be apparent to those skilled in the art having the benefit of this disclosure that many more modifications than mentioned above are possible without departing from the inventive concepts herein.

What is claimed is:

1. A system to detect an interrupt signal on a universal serial bus (USB), comprising:
   at least one peripheral device;
   a controller coupled to the at least one peripheral device via the USB, the USB having at least one power line;
   wherein the at least one peripheral device is configured to detect an interrupt event and to superimpose high frequency interrupt communication signals on the at least one power line for transmission to the controller in immediate response to the interrupt event,
   wherein the controller is configured to detect the high frequency interrupt communication signals,
   the controller is configured to process the interrupt event in immediate response to detecting the high frequency interrupt signals, and
   the controller is configured to transmit high frequency communication signals to the at least one peripheral device on the at least one power line,
   wherein each of the at least one peripheral devices further comprises an overcurrent generator to transmit additional current to the USB in immediate response to an interrupt event.

2. The system of claim 1, wherein the high frequency interrupt communication signal and the high frequency communication signal are transmitted at a frequency greater than 60 Hz.

3. The system of claim 1, further comprising at least one overcurrent detector coupled to the USB, wherein the overcurrent detector is configured to detect the additional current and further configured to generate an interrupt signal for transmission to the controller in immediate response to detecting the additional current.

4. The system of claim 1, further comprising:
   a first modulator/demodulator coupled to the controller, the first modulator/demodulator for detecting the high frequency interrupt communication signals on the at least one power line; and
   a second modulator/demodulator coupled to the at least one peripheral device, the second modulator/demodulator for superimposing high frequency interrupt communication signals on the at least one power line.

5. The system of claim 1, wherein the controller is a master gaming controller and the at least one peripheral device is a player tracking device.

6. A gaming machine, comprising:
   a master gaming controller to generate a game of chance;
   at least one peripheral device coupled to the master gaming machine via a universal serial bus (USB), the USB having at least one power line;
   wherein the at least one peripheral device is configured to detect an interrupt event and to superimpose high frequency interrupt communication signals on the at least one power line for transmission to the master gaming controller in immediate response to the interrupt event,
   wherein the master gaming controller is configured to detect the high frequency interrupt signals,
   the master gaming controller is configured to process the interrupt event in immediate response to detecting the high frequency interrupt signals,
   the master gaming controller is configured to transmit high frequency communication signals to the at least one peripheral device on the at least one power line, and
   each of the at least one peripheral devices further comprises an overcurrent generator to transmit additional current to the power line in immediate response to an interrupt event.

7. The gaming machine of claim 6, wherein the high frequency interrupt communication signal and high frequency communication signal are transmitted at a frequency greater than 60 Hz.

8. The gaming machine of claim 6, further comprising at least one overcurrent detector coupled to the USB, wherein the overcurrent detector is configured to detect the additional current and further configured to generate an interrupt signal for transmission to the master gaming controller in immediate response to detecting the additional current.

9. The gaming machine of claim 6, further comprising:
   a first modulator/demodulator coupled to the master gaming controller, the first modulator/demodulator for detecting the high frequency interrupt communication signals on the at least one power line; and
   a second modulator/demodulator coupled to the at least one peripheral device, the second modulator/demodulator for superimposing high frequency interrupt communication signals on the at least one power line.

10. A method to detect an interrupt in a gaming machine, the method comprising:
    detecting an interrupt event by at least one peripheral device;
    generating a high frequency interrupt signal in immediate response to the interrupt event;
    superimposing the high frequency interrupt signal over a power line of a universal serial bus (USB) in immediate response to generating the high frequency interrupt signal;
    and transmitting the high frequency interrupt signal to a master gaming controller over the power line,
    wherein detecting an interrupt event further comprises generating additional current from an overcurrent generator in the at least one peripheral device and transmitting the additional current to the USB in immediate response to the interrupt event.

11. The method of claim 10, further comprising:
    detecting the high frequency interrupt signal at the master gaming controller; and
    processing the interrupt event at the master gaming controller in immediate response to detecting the high frequency interrupt signal.

12. The method of claim 10, further comprising transmitting a high frequency communication signal from the master gaming controller to the at least one peripheral device via the power line.

13. The method of claim 12, wherein the high frequency interrupt communication signal and the high frequency communication signal have a frequency greater than 60 Hz.

14. The method of claim 10, further comprising:
    detecting the additional current by an overcurrent detector; and
    transmitting an interrupt signal to the master gaming controller in immediate response to detecting the additional current.

15. The method of claim 14, further comprising determining in real-time which of the at least one peripheral devices generated the additional current.

16. A gaming machine, comprising:
    a display unit;
    a value input device;
    a master gaming controller configured to generate a game of chance, wherein the controller is operatively coupled to the display unit and the value input device, and the controller comprises a processor and a memory operatively coupled to the processor; and at least one peripheral device comprising an overcurrent generator configured to transmit additional current to the controller via a universal serial bus (USB) power line in immediate response to an interrupt event, wherein the controller is configured to detect the additional current and further configured to process the interrupt event in immediate response to detecting the additional current.

17. The gaming machine of claim 16, further comprising at least one overcurrent detector coupled to the USB and in communication with the controller, wherein the overcurrent detector is configured to detect the additional current and further configured to generate an interrupt signal for transmission to the controller in immediate response to detecting the additional current.

18. The gaming machine of claim 16, wherein the controller is configured to transmit additional response current to the at least one peripheral device on the at least one power line.

* * * * *